United States Patent
Kemps et al.

(10) Patent No.: US 12,065,566 B2
(45) Date of Patent: Aug. 20, 2024

(54) IMPACT-RESISTANT POLYMER COMPOSITION

(71) Applicants: SABIC Global Technologies B.V., Bergen op Zoom (NL); Yparex B.V., Enschede (NL)

(72) Inventors: Jorgen Jacobus Hendricus Gerardus Kemps, Bergen op Zoom (NL); Priya Garg, Bergen op Zoom (NL); Franciscus Antoinet Maria Huijnen, Geleen (NL); Wouter Van Den Berg, Geleen (NL)

(73) Assignees: SABIC GLOBAL TECHNOLOGIES B.V., Bergen op Zoom (NL); YPAREX B.V., Enschede (NL)

( * ) Notice: Subject to any disclaimer, the term of this patent is extended or adjusted under 35 U.S.C. 154(b) by 376 days.

(21) Appl. No.: 17/059,625

(22) PCT Filed: Jun. 3, 2019

(86) PCT No.: PCT/EP2019/064349
§ 371 (c)(1),
(2) Date: Nov. 30, 2020

(87) PCT Pub. No.: WO2019/233949
PCT Pub. Date: Dec. 12, 2019

(65) Prior Publication Data
US 2021/0261773 A1    Aug. 26, 2021

(30) Foreign Application Priority Data
Jun. 4, 2018   (EP) ..................... 18175764

(51) Int. Cl.
C08L 77/02    (2006.01)
C08K 7/14     (2006.01)
C08L 23/08    (2006.01)

(52) U.S. Cl.
CPC .............. C08L 77/02 (2013.01); C08K 7/14 (2013.01); C08L 23/0815 (2013.01); C08L 23/0869 (2013.01); C08L 2203/30 (2013.01); C08L 2205/02 (2013.01); C08L 2205/03 (2013.01); C08L 2207/04 (2013.01)

(58) Field of Classification Search
CPC ........... C08L 77/00–12; C08L 23/0815; C08L 23/0869; C08L 2205/02; C08L 2205/025; C08L 2205/03; C08L 2207/04
See application file for complete search history.

(56) References Cited

U.S. PATENT DOCUMENTS

| | | | |
|---|---|---|---|
| 4,174,358 A | 11/1979 | Epstein | |
| 5,017,714 A | 5/1991 | Welborn, Jr. | |
| 5,324,820 A | 6/1994 | Baxter | |
| 2002/0156191 A1* | 10/2002 | Bruls | C08J 3/005 525/146 |
| 2002/0197495 A1* | 12/2002 | Tamura | B32B 27/281 428/474.4 |
| 2019/0055402 A1* | 2/2019 | I | C08K 3/04 |

FOREIGN PATENT DOCUMENTS

| | | | |
|---|---|---|---|
| EP | 1647575 A1 * | 4/2006 | |
| EP | 1911511 A1 * | 4/2008 | |
| JP | 2010520328 A * | 6/2010 | |
| JP | 2012071491 A * | 4/2012 | |
| JP | 2014062194 A * | 4/2014 | |
| WO | 0077078 A1 | 12/2000 | |
| WO | 02070605 A1 | 9/2002 | |

OTHER PUBLICATIONS

JP 2012071491 A machine translation (Apr. 2012).*
JP 2014062194 A machine translaiton (Apr. 2014).*
JP 2010520328 A machine translation (Jun. 2010).*
International Search Report for International Application No. PCT/EP2019/064349, International Filing Date Jun. 3, 2019, Date of Mailing Sep. 17, 2019, 5 pages.
Written Opinion for International Application No. PCT/EP2019/064349, International Filing Date Jun. 3, 2019, Date of Mailing Sep. 17, 2019, 5 pages.
Anonymous: "EXACT 8230 Octene-1 Plastomer Data Sheet", DEXPlastomers, Jul. 1, 2011 (Jul. 1, 2011), pp. 1-2, XP055624673.
European Office Action for European Application No. 19727692.6 dated Feb. 23, 2023, 5 pages.

* cited by examiner

Primary Examiner — Ana L. Woodward
(74) Attorney, Agent, or Firm — CANTOR COLBURN LLP

(57) ABSTRACT

The invention relates to a composition comprising: a) 30-90 wt % of a polyamide and b) 10-40 wt % of a polyethylene elastomer (POE) composition, wherein the amounts of a) and b) are with respect to the total composition, wherein the total of a) and b) is at least 60 wt % with respect to the total composition, wherein the POE composition consists of: b1) 20-95 wt % of a non-functionalized polyethylene elastomer and b2) 5-80 wt % of a functionalized polyethylene elastomer, wherein the amounts of b1) and b2) are with respect to the POE composition.

16 Claims, No Drawings

IMPACT-RESISTANT POLYMER COMPOSITION

CROSS REFERENCE TO RELATED APPLICATIONS

This application is a National Stage application of PCT/EP2019/064349, filed Jun. 3, 2019, which claims the benefit of European Application No. 18175764.2, filed Jun. 4, 2018, both of which are incorporated by reference in their entirety herein.

The invention relates to an impact-resistant polymer composition comprising a polyamide and a polyethylene elastomer, to a process for obtaining such composition, to the use of such composition and an article comprising such composition.

Impact-resistant polymer compositions are known in the art and examples of such compositions are found in the following documents.

U.S. Pat. No. 4,174,358 discloses various processes for the preparation of impact-resistant polymer compositions.

WO00/77078 discloses a process for the preparation of an impact-resistant polymer composition by melt mixing a matrix polyamide with a composition comprising a rubber composition dispersed in a polyamide. The rubber composition comprises a functionalized polyethylene elastomer (maleic acid modified ethylene-octene copolymer) and a non-functionalized polyethylene elastomer (non-modified ethylene-octene copolymer). In Example 8, 90 wt % of a polyamide is mixed with 10 wt % of a composition consisting of 50 wt % of a polyamide, 10 wt % of a maleic acid modified ethylene-octene copolymer and 40 wt % of a non-modified ethylene-octene copolymer.

While the known compositions are satisfactory in some situations, there is a demand for a composition having a good balance of mechanical properties such as impact strength, flexural modulus and tensile modulus.

It is an object of the invention to provide a composition having a good balance of mechanical properties such as impact strength, flexural modulus and tensile modulus.

Accordingly, the present invention provides a composition comprising:
- a) 30-90 wt % of a polyamide and
- b) 10-40 wt % of a polyethylene elastomer (POE) composition, wherein the amounts of a) and b) are with respect to the total composition,
wherein the total of a) and b) is at least 60 wt % with respect to the total composition,
wherein the POE composition consists of:
- b1) 20-95 wt % of a non-functionalized polyethylene elastomer and
- b2) 5-80 wt % of a functionalized polyethylene elastomer, wherein the amounts of b1) and b2) are with respect to the POE composition.

It was surprisingly found that the composition according to the invention exhibits a good balance of mechanical properties such as impact strength, flexural modulus and strain at break.

The invention relates also to a process for obtaining such composition, to the use of such composition and an article comprising such composition.

a) Polyamide

The amount of the polyamide with respect to the total composition is 30-90 wt %. For example, the amount of the polyamide with respect to the total composition is 30-70 wt %, 35-60 wt % or 40-50 wt %. For example, the amount of the polyamide with respect to the total composition is 70-90 wt % or 75-85 wt %.

The polyamide may be an aliphatic polyamide, a semi-aromatic polyamide or an aromatic polyamide, or a blend thereof.

Suitable examples of polyamides can be found e.g. in Rompp Chemie-Lexikon, 9th edition, volume 5, page 359 ff. and the citations mentioned therein. However, the polyamides PA 6, PA 46, PA 66, PA 11, PA 12, PA 6T/66, PA 6T/61, PA 61/6T, PA 6/6T, PA 6/66, PA 8T, PA 9T, PA 12T, PA 69, PA 610, PA 612, PA 1012, PA 1212, PA MACM12, PA PACM12, PA MACMT, PA PACP12, PA NDT, PA MXDI, PA NI, PA NT, PA TMHMDAT, PA 12/PACMT/PACMI, PA 12/MACMI/MACMT, PA N12, PA 6/MACMI or blends thereof are preferred. Preferably, the polyamide is selected from the group consisting of polyamide-6, polyamide-6,6 polyamide-4,6 and mixtures thereof.

More preferably, the polyamide is polyamide-6. Even more preferably, the polyamide is polyamide −6 having a relative solution viscosity higher than 2, preferably higher than 2.2, and lower than 2.8, preferably lower than 2.6. The relative solution viscosity is measured according to ISO 307:2007 and determined using a solution of 1 gram of polyamide-6 in 100 ml of 90 wt percent strength formic acid at 25.00 degrees centigrade. An example of such polyamide is Akulon K122 from DSM with a relative solution viscosity (RSV) in formic acid (1 g/100 ml) of 2.28.

b) POE Composition

The amount of the POE composition with respect to the total composition is 10-40 wt %, for example 15-30 wt % or 15-25 wt %.

The POE composition consists of a non-functionalized polyethylene elastomer and a functionalized polyethylene elastomer, i.e. the total amount of the non-functionalized polyethylene elastomer and the functionalized polyethylene elastomer is 100 wt % with respect to the POE composition.

The amount of the non-functionalized polyethylene elastomer is 20-95 wt % of the POE composition and the amount of the functionalized polyethylene elastomer is 5-80 wt % of the POE composition.

The amount of the non-functionalized polyethylene elastomer is preferably at least 25 wt %, more preferably at least 30 wt %, more preferably at least 40 wt %, more preferably at least 50 wt %, more preferably at least 60 wt % of the POE composition.

The relatively high amount of the non-functionalized polyethylene elastomer in the POE composition was surprisingly found to lead to a very high impact strength while maintaining the other mechanical properties to an acceptable level. Typically, the amount of the non-functionalized polyethylene elastomer is at most 90 wt % or at most 80 wt % of the POE composition.

b1) Non-Functionalized Polyethylene Elastomer

Preferably, the non-functionalized polyethylene elastomer is a copolymer of ethylene and an α-olefin comonomer having 4 to 8 carbon atoms.

Preferably, the elastomer is selected from the group consisting of ethylene-1-butene copolymer, ethylene-1-hexene copolymer, ethylene-1-octene copolymer, preferably selected from the group consisting of ethylene-1-butene copolymer and ethylene-1-octene copolymer, most preferably is ethylene-1-octene copolymer.

Preferably, the elastomer has a density of 0.850-0.910 g/cm3 as determined by ASTM D792.

For example, the elastomer may have a density of 0.850-0.860 g/cm3 as determined by ASTM D792.

For example, the elastomer may have a density of 0.860-0.870 g/cm3 as determined by ASTM D792.

For example, the elastomer may have a density of 0.870-0.910 g/cm3, 0.870-0.905 g/cm3, 0.870-0.900 g/cm3 or 0.875-0.890 g/cm3 as determined by ASTM D792.

Preferably, the elastomer has a melt flow index as determined by ISO1133-1:2011 (2.16 kg, 190° C.) of 0.1-100 dg/min, for example 0.1-50 dg/min, 0.1-20 dg/min or 0.1-10 dg/min.

For example, the elastomer has a melt flow index as determined by ISO1133-1:2011 (2.16 kg, 190° C.) of 0.1-2 dg/min.

For example, the elastomer has a melt flow index as determined by ISO1133-1:2011 (2.16 kg, 190° C.) of 2-4 dg/min.

For example, the elastomer has a melt flow index as determined by ISO1133-1:2011 (2.16 kg, 190° C.) of 4-10 dg/min.

In some preferred embodiments, the elastomer has a density of 0.850-0.860 g/cm3 as determined by ASTM D792 and a melt flow index as determined by ISO1133-1:2011 (2.16 kg, 190° C.) of 0.1-2 dg/min. The use of such elastomer leads to a particularly high impact strength of the composition.

In other preferred embodiments, the elastomer has a density of 0.860-0.870 g/cm3 as determined by ASTM D792 and a melt flow index as determined by ISO1133-1:2011 (2.16 kg, 190° C.) of 4-10 dg/min. The use of such elastomer leads to a particularly high flexural modulus of the composition.

Elastomers which are suitable for use in the current invention are commercially available for example under the tradename SABIC FORTIFY™ and under the tradename SABIC COHERE™. Other possible elastomers include elastomers commercially available under the trademark EXACT™ available from Exxon Chemical Company of Houston, Texas, under the trademark ENGAGE™ polymers, a line of metallocene catalyzed plastomers available from Dow Chemical Company of Midland, Michigan. Dow AFFINITY™ can also be mentioned as the possible elastomer. Particularly suitable elastomers include FORTIFY™ C5070D, C3080 and C1055D.

The elastomers may be prepared using methods known in the art, for example by using a single site catalyst, i.e., a catalyst the transition metal components of which is an organometallic compound and at least one ligand of which has a cyclopentadienyl anion structure through which such ligand bondingly coordinates to the transition metal cation. This type of catalyst is also known as "metallocene" catalyst. Metallocene catalysts are for example described in U.S. Pat. Nos. 5,017,714 and 5,324,820. The elastomers may also be prepared using traditional types of heterogeneous multisited Ziegler-Natta catalysts.

Preferably, the amount of moieties derived from ethylene in the elastomer is at least 50 mol %. More preferably, the amount of moieties derived from ethylene in the elastomer is at least 57 mol %, for example at least 60 mol %, at least 65 mol % or at least 70 mol %. Even more preferably, the amount of moieties derived from ethylene in the elastomer is at least 75 mol %. The amount of moieties derived from ethylene in the elastomer may typically be at most 97.5 mol %, for example at most 95 mol % or at most 90 mol %.

b2) Functionalized Polyethylene Elastomer

The functionalized polyethylene elastomer is a polyethylene elastomer having functional groups.

A non-functionalized polyethylene elastomer as described above can be functionalized to obtain the functionalized polyethylene elastomer. The types of the polyethylene elastomer in the b1) non-functionalized polyethylene elastomer and the b2) functionalized polyethylene elastomer can be the same or different.

Functional groups can be introduced onto the polyethylene elastomer in many ways. A great many preparation methods and examples of these functionalized polyethylene elastomers are described, for instance, in U.S. Pat. No. 4,174,358. Several of these functionalized elastomers are commercially available under different names.

Examples of suitable compounds for providing the functional group in the functionalized polyethylene elastomer include an unsaturated dicarboxylic anhydride or an unsaturated dicarboxylic acid or an ester thereof, for instance maleic anhydride, itaconic acid and itaconic anhydride, fumaric acid and maleic acid or a glycidyl acrylate, for instance glycidyl methacrylate, and vinyl alkoxysilane. The functional groups are highly reactive relative to, inter alia, amino end groups and acid end groups in polyamides.

Preferably, the amount of the compounds for providing the functional group in the functionalized polyethylene elastomer is 0.01-5.0 wt %, more preferably 0.3 and 3.0 wt %, with respect to the functionalized polyethylene elastomer.

c) Reinforcing Fillers

The composition according to the invention may further comprise reinforcing fillers, such as reinforcing fibres, such as glass fibres and carbon fibres, preferably glass fibres. This is suitable for obtaining a high flexural modulus and a high tensile modulus The amount of the glass fibres is 0-40 wt % with respect to the total composition. When present, the amount of the glass fibres is preferably 1-40 wt %, 1-35 wt %, 5-35 wt %, 10-35 wt %, 20-35 wt % or 25-35 wt %, with respect to the total composition.

It should be appreciated that the fibers may vary in size (e.g. length, diameter, etc.) and may be coated or uncoated. For example, in one embodiment, the fibers may have an average diameter of less than 13 microns. In other embodiments, the fibers may have an average diameter of 10 microns or less.

The fibers may include components to encourage bonding between the polymers in the composition and the fibers. Examples of suitable fibers for the present invention include NEG Fibre Glass™ Chopvantage HP3610.

Additives

The composition according to the invention may further comprise optional components such as additives.

The skilled person can readily select any suitable combination of additives and additive amounts without undue experimentation. The amount of the additives depends on their type and function and typically is of 0 to 10 wt %, more typically 0.1 to 5 wt % or 0.5 to 2 wt %, with respect to the total composition.

The additives may include nucleating agents, stabilisers, e.g. heat stabilisers, anti-oxidants, UV stabilizers; colorants, like pigments and dyes; clarifiers; surface tension modifiers; lubricants; flame-retardants; mould-release agents; flow improving agents; plasticizers; anti-static agents; blowing agents.

Preferably, the total amount of the polyamide, the POE composition, the optional reinforcing fillers and the optional additives is 100 wt % with respect to the total composition.

Preferably, the total amount of the polyamide, the POE composition and the optional reinforcing fillers is at least 90 wt %, at least 95 wt %, at least 98 wt %, at least 99 wt % of 100 wt % with respect to the total composition.

In some preferred embodiments, the total amount of the polyamide and the POE composition is at least 90 wt %, at least 95 wt %, at least 98 wt %, at least 99 wt % of 100 wt % with respect to the total composition.

Properties

Preferably, the composition according to the invention, in particular wherein the total amount of the polyamide and the POE composition is at least 90 wt %, has a Charpy impact strength according to ISO 179-1: 2010 at 23° C. of at least 30 kJ/m$^2$, more preferably at least 40 kJ/m2, more preferably at least 50 kJ/m2, more preferably at least 60 kJ/m2, more preferably at least 70 kJ/m2, more preferably at least 80 kJ/m2.

Preferably, the composition according to the invention, in particular wherein the total amount of the polyamide and the POE composition is at least 90 wt %, has a flexural modulus according to ISO 178:2010 incorporating amendment 2013 at 23° C. of at least 1300 MPa, more preferably at least 1400 MPa.

Preferably, the composition according to the invention, in particular wherein the total amount of the polyamide and the POE composition is at least 90 wt %, has a tensile modulus according to ISO 527-2:2012 at 23° C. of at least 1600 MPa, more preferably at least 1700 MPa.

Preferably, the composition according to the invention, in particular wherein the composition comprises glass fibres at an amount of 1-40 wt %, has a Charpy impact strength according to ISO 179-1:2010 at 23° C. of at least 25 kJ/m2, more preferably at least 30 kJ/m2, more preferably at least 40 kJ/m2.

Preferably, the composition according to the invention, in particular wherein the composition comprises glass fibres at an amount of 1-40 wt %, has a flexural modulus according to ISO 178:2010 at 23° C. of at least 3000 MPa, more preferably at least 5000 MPa.

Preferably, the composition according to the invention, in particular wherein the composition comprises glass fibres at an amount of 1-40 wt %, has a tensile modulus according to ISO 527-2:2012 at 23° C. of at least 3000 MPa, more preferably at least 5000 MPa.

Preferably, the measurements of the flexural modulus and the tensile properties of the composition are performed on samples which have been conditioned for 16 hours at a relative humidity of 50% at 23° C. Preferably, the measurement of the flexural modulus is performed at 50% relative humidity (parallel orientation; test geometry: 3.2 mm thickness) at a cross-head speed of 2 mm/min. Preferably, the measurements of the tensile properties are performed at 50% relative humidity (specimen 1A, prepared by injection molding). Preferably, the measurement of the tensile modulus is performed at speeds of 1 mm/min; the tensile strength is performed at 50 mm/min for compositions free of reinforcing fillers and at 5 mm/min for compositions comprising reinforcing filler.

Further Aspects

The composition according to the invention may be processed by any conventional technique known in the art into an article. Suitable examples of processing techniques wherein the composition according to the invention may be used include injection moulding, injection blow moulding, injection stretch blow moulding, rotational moulding, compression moulding, extrusion, extrusion compression moulding, extrusion blow moulding, sheet extrusion, film extrusion, cast film extrusion, foam extrusion, thermoforming and thin-walled injection moulding.

The invention further relates to an article comprising the composition according to the invention. In particular, the invention relates to an article comprising the composition according to the invention, wherein the article is made by one of the processing techniques mentioned above. Examples of the (injection moulded) articles according to the invention include articles in automotive applications such as air dams, gas caps, hood releases, cables and straps, steering column shields, trim clips, oil pans, starter coilforms, and transmission cables. The examples further include consumer items, including bike wheels, toys, roller skates, ice skates, and ski boots. The examples further include hardware and furniture parts, industrial machinery parts, materials handling systems, and articles such as hammer handles, door striker parts, valve bodies, and oscillating machinery parts. The examples further include electrical connectors and switches.

It will be appreciated that the article comprising the composition is made by processing the composition according to the invention such that the ratio of the components of the composition is substantially maintained. Thus, no further components, particularly no amounts of a polyamide, a non-functionalized polyethylene elastomer or a functionalized polyethylene elastomer is added to the composition according to the invention before or during the processing of the composition according to the invention into an article.

Thus, the invention provides an article consisting of the composition according to the invention.

According to another aspect, the present invention provides a process for making the composition according to the invention by melt-mixing components a), b1) and b2) and other optional components. Suitable conditions for melt-mixing, such as temperature, pressure, amount of shear, screw speed and screw design when an extruder is used are known to the skilled person. The invention further provides a process for making an article comprising the process for making the composition according to the invention by melt-mixing components a), b1) and b2) and other optional components and processing the composition according to the invention into the article, wherein no amounts of a polyamide, a non-functionalized polyethylene elastomer or a functionalized polyethylene elastomer is added to the composition according to the invention before or during the processing.

In some embodiments, the process comprises the steps of melt-mixing b1) and b2) to make a blend and subsequently melt-mixing the blend and the a).

In other embodiments, the process comprises the step of melt-mixing a), b1) and b2) without a prior melt-mixing of b1) and b2).

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated by way of the following examples, without however being limited thereto.

Materials

The materials used were the following:

PA6: DSM™ Akulon K122)

Polyethylene elastomers (POE): C2-C8 copolymer SABIC FORTIFY™ C5070D, C3080 and C1055D Polyethylene grafted with Maleic anhydride (compatibilizer): Yparex™ 0H247

Glass fibres: NEG Fibre Glass™ Chopvantage HP3610

The SABIC FORTIFY™ POEs used have the following MI(190° C./2.16 kg) and density:

|      | FORTIFY ™ grade | MI(190° C./2.16 kg) (g/10 min) | Density (kg/m³) |
|------|-----------------|-------------------------------|-----------------|
| POE1 | C5070D          | 5                             | 868             |
| POE2 | C3080           | 3                             | 880             |
| POE3 | C1055D          | 1                             | 7               |

Compounding Procedure:

Before compounding, the PA6 was dried at least 4 h in a dry-air drier to assure the dryness of the PA6. Typically, the compounding process was carried out in a twin screw extruder (26 mm) which has two side feeders, two atmospheric vent ports (one per side feeder) and one vacuum forced venting port in the final part of the extruder. Each component of the formulation was independently fed to the extruder with a gravimetric feeder. The PA6 and the Yparex compatibilizer were fed through the main hopper, whereas the POE was fed in the first side feeder. For glass fibre filled compounds, the glass fibres were fed through the second side feeder. The screw design has two dispersive zones, the first one to melt the PA6 and compatibilizer (if needed in the composition), and the second one to melt and disperse the POE in the molten polymer. Finally, two short distributive zones were implemented to incorporate the glass fibres in the molten compound without breaking the fibres in excess.

The following compounds were made:

Comparative Example A: PA6 was compounded in the extruder based on the typical procedure mentioned above.

Comparative Example B: PA6 and a POE were compounded so that the final ratio of PA6 to POE is 80% to 20% (weight/weight).

Comparative Example C: The compounding was carried out similar to the procedure for comparative Example B with the exception that a compatibilizer was used instead of a POE.

Example I-VIII and Comparative Example F and G: The compounding was carried out similar to the procedure for comparative example B with the exception that various ratios of the POEs and compatibilizer were used. The compositions prepared are summarized in Table 2. The amounts of the components are in wt % with respect to the total composition.

All materials (pellets from Comparative Example A, B and C and experimental grades I-VIII) were dried at 80° C. in a dehumidifying oven for about 8 hours before injection moulding.

Injection moulding conditions: All injection moulding was carried out either on an Engel 90-T or an Arburg Allrounder machine. Injection moulding conditions typically used are summarized in Table:

TABLE 1

Typical injection moulding conditions used

| Hopper temp        | ° C.  | 40   |
|--------------------|-------|------|
| Zone 1 temperature | ° C.  | 255  |
| Zone 2 temperature | ° C.  | 265  |
| Zone 3 temperature | ° C.  | 275  |
| Nozzle temperature | ° C.  | 270  |
| Mold temperature   | ° C.  | 80   |
| Screw speed        | rpm   | 25   |
| Injection time     | s     | 1.20 |
| Holding time       | s     | 15   |
| Cooling time       | s     | 30   |
| Injection speed(mm/s) | mm/s | 40 |

The injection moulded specimens were directly sealed in an aluminium bag and stored at 23° C. till further testing. Before testing, the test specimens were taken out of the aluminium bag. The test specimens were conditioned at 23° C. and 50% humidity for 16 hours.

Measurements

The melt index $MI_{(190/2.16)}$ of the POE was measured according to method ISO 1133-1:2011 under a load of 2.16 kg at 190° C.

Density was determined according to ASTM D792.

Notched Charpy was measured according to ISO 179-1: 2010 at 23° C.

Flexural modulus (3 point) was measured according to ISO 178:2011 incorporating amendment of 2013 at 23° C. and 50% relative humidity (parallel orientation; test geometry: 3.2 mm thickness). The measurements were performed on samples which have been conditioned for 16 hours at a relative humidity of 50% at 23° C. The measurement of the flexural modulus was performed at a cross-head speed of 2 mm/min.

Tensile tests were performed according to ISO 527-2 at 23° C. and 50% relative humidity (specimen 1A, prepared by injection molding). The measurements were performed on samples which have been conditioned for 16 hours at a relative humidity of 50% at 23° C.. The measurement of the tensile modulus was performed at speeds of 1 mm/mmn; the tensile strength was performed at 50 mm/mmn for glass-free compositions and 5 mm/mmn for glass fibre filled compositions.

The results of the mechanical tests performed on the samples are summarized in Table 2:

TABLE 2

|      | I  | II | III | IV | V  | VI | VII | VIII |
|------|----|----|-----|----|----|----|-----|------|
| PA6  | 80 | 80 | 80  | 80 | 80 | 80 | 80  | 80   |
| POE1 |    |    | 5   | 10 | 15 |    |     |      |
| POE2 | 5  | 10 |     |    |    |    |     |      |
| POE3 |    |    |     |    |    | 5  | 10  | 15   |

TABLE 2-continued

| | | | | | | | | |
|---|---|---|---|---|---|---|---|---|
| 0H247 | 15 | 10 | 15 | 10 | 5 | 15 | 10 | 5 |
| Charpy Impact strength (kJ/m$^2$) | 44.0 | 58.9 | 34.0 | 59.9 | 74.2 | 57.5 | 67.1 | 82.2 |
| Flexural Modulus (MPa) | 1374 | 1502 | 1338 | 1356 | 1362 | 1338 | 1340 | 1362 |
| Flexural Strength (MPa) | 54.4 | 61.2 | 54.9 | 56.2 | 55.8 | 55.0 | 54.9 | 56.2 |
| Stress at 3.5% strain (MPa) | 43.2 | 48.7 | 43.2 | 44.2 | 44.3 | 43.3 | 43.6 | 44.4 |
| Tensile E-modulus (MPa) | 1698 | 1829 | 1688 | 1678 | 1656 | 1657 | 1699 | 1638 |
| Tensile Stress at yield (MPa) | 45.5 | 49.3 | 45.8 | 46.9 | 45.4 | 45.1 | 44.6 | 44.4 |
| Stress at break (MPa) | 36.4 | 38.6 | 35.9 | 37.0 | 37.3 | 35.7 | 35.1 | 36.9 |

| | Comp. A | Comp. B | Comp. C | Comp. F | Comp. G |
|---|---|---|---|---|---|
| PA6 | 100 | 80 | 80 | 95 | 50 |
| POE1 | | | | | |
| POE2 | | 20 | | 2.5 | 25 |
| POE3 | | | | | |
| 0H247 | | | 20 | 2.5 | 25 |
| Charpy Impact strength (kJ/m$^2$) | 4.9 | 23.7 | 37.6 | 10.6 | 66.9 |
| Flexural Modulus (MPa) | 2307 | 1768 | 1275 | 2041 | 415 |
| Flexural Strength (MPa) | 95.4 | 73.1 | 50.8 | 79.6 | 16.0 |
| Stress at 3.5% strain (MPa) | 75.3 | 57.7 | 40.2 | 64.6 | 12.2 |
| Tensile E-modulus (MPa) | 2702 | 2073 | 1591 | 2302 | 492 |
| Tensile Stress at yield (MPa) | 74.4 | 57.6 | 43.1 | 63.7 | 24.1 |
| Stress at break (MPa) | 56.9 | 46.8 | 34.8 | 41.7 | 28.2 |

The impact property of Comparative example A is rather low. With the addition of a POE, the impact property increases significantly (Comparative example B). By adding only the compatibilizer, the impact property increases further (Comparative example C). A real jump in impact property is seen for Examples I-VIII when compared to the comparative example A. Surprisingly, the high ratio of POE to the compatibilizer led to a significant increase in the impact strength.

The flexural and tensile properties decrease from Comparative example A to Comparative Example B when the POE is added. However, the flexural and tensile properties decrease even further when only the compatibilizer is used (Comparative Example C) instead of the POE (Comparative Example B). Interestingly, these properties improve (compared to Comparative Example C) when a combination of the compatibilizer and the POE is used. The flexural and tensile properties of the examples I-VIII are rather comparable.

These examples show that the compositions according to the invention have a good balance of various mechanical properties. In particular, the compositions comprising POE3 have a very high impact strength.

Glass Fiber Filled Compounds

Comparative Example D is a typical glassfiber filled PA6 compound (30% glass) that is commercially available as DSM™ Akulon K224-G6.

Comparative Example E is a typical impact modified glassfiber filled PA6 compound (30% glass) that is commercially available as DSM™ Akulon K224-PG6.

Example IX-XI were compounded similar to Comparative Example B. In these samples, 30% m/m of glass fibres (Chopvantage HP3610) were added. The ratios of POE and compatibilizer used are given in Table 3.

TABLE 3

| | Comp D | Comp E | Example IX | Example X | Example XI |
|---|---|---|---|---|---|
| PA6 | | | 52 | 48 | 34 |
| POE2 | | | 10 | 10 | 20 |
| 0H247 | | | 8 | 12 | 16 |
| Charpy Impact strength (KJ/m$^2$) | 15 | 23 | 29 | 30 | 46 |
| Flexural Modulus (MPa) | 8600 | | 6650 | 6860 | 3850 |
| Tensile E-modulus (MPa) | 9500 | 8500 | 7890 | 6930 | 4150 |
| Elongation at break (%) | 3.5 | 4.5 | 5.1 | 4.6 | 6.6 |

The impact property of Comparative Example D is 15 kJ/m. The impact modified comparative example E has a higher value than comparative Example D. However, by taking different ratios of POE and compatibilizer, the impact property significantly increases compared to comparative example D. The flexural and tensile moduli decrease with increasing POE content.

These examples show that the compositions according to the invention comprising glass fibers have a good balance of various mechanical properties.

The invention claimed is:
1. A composition consisting of:
   a) 75-85 wt % of a polyamide,
   b) 15-25 wt % of a polyethylene elastomer (POE) composition,
   c) optionally reinforcing fillers, and
   d) 0 to 10 wt % of an additive selected from the group consisting of nucleating agents, stabilisers; lubricants; flame-retardants; mould-release agents; flow improving agents; plasticizers; anti-static agents; and blowing agents, wherein the amounts of a), b) and d) are with respect to the total composition, wherein the total of a) and b) is at least 90 wt % with respect to the total composition, wherein the POE composition consists of:

b1) 20-95 wt % of a non-functionalized polyethylene elastomer and b2) 5-80 wt % of a functionalized polyethylene elastomer, wherein the amounts of b1) and b2) are with respect to the POE composition, wherein the functionalized polyethylene elastomer has a functional group derived from an unsaturated dicarboxylic anhydride or an unsaturated dicarboxylic acid or an ester thereof, and wherein the non-functionalized polyethylene elastomer has a density of 0.850-0.900 g/cm$^3$, wherein the composition has a Charpy impact strength according to ISO 179-1:2010 at 23° C. of at least 30 kJ/m2.

2. The composition according to claim 1, wherein the polyamide is polyamide-6, polyamide-6,6, polyamide-4,6, or mixtures thereof.

3. The composition according to claim 1, wherein the non-functionalized polyethylene elastomer is ethylene-1-butene copolymer, ethylene-1-hexene copolymer, or ethylene-1-octene copolymer.

4. The composition according to claim 1, wherein the amount of the non-functionalized polyethylene elastomer is at least 25 wt %, of the POE composition.

5. The composition according to claim 1, wherein the non-functionalized polyethylene elastomer has a melt flow index as determined by ISO1133-1:2011 (2.16 kg, 190° C.) of 0.1-100 dg/min.

6. The composition according to claim 1, wherein the non-functionalized polyethylene elastomer has a density of 0.850-0.860 g/cm$^3$ and a melt flow index as determined by ISO1133-1:2011 (2.16 kg, 190° C.) of 0.1-2 dg/min or wherein the non-functionalized polyethylene elastomer has a density of 0.860-0.870 g/cm$^3$ and a melt flow index as determined by ISO1133-1:2011 (2.16 kg, 190° C.) of 4-10 dg/min.

7. The composition according to claim 1, wherein the amount of compounds for providing the functional group in the functionalized polyethylene elastomer is 0.01-5.0 wt %, with respect to the functionalized polyethylene elastomer.

8. The composition according to claim 1, wherein the composition comprises glass fibers as c) reinforcing fillers.

9. The composition according to claim 1, wherein the composition has a Charpy impact strength according to ISO 179-1:2010 at 23° C. of at least 40 kJ/m2.

10. An article made by processing the composition according to claim 1 into the article.

11. The article of claim 10, wherein the processing is selected from injection moulding, injection blow moulding, injection stretch blow moulding, rotational moulding, compression moulding, extrusion, extrusion compression moulding, extrusion blow moulding, sheet extrusion, film extrusion, cast film extrusion, foam extrusion, thermoforming, or thin-walled injection moulding.

12. A moulded article comprising the composition according to claim 1.

13. The article according to claim 12, wherein the article has a Charpy impact strength according to ISO 179-1:2010 at 23° C. of at least 40 kJ/m2.

14. The composition according to claim 1, wherein the polyamide is polyamide-6.

15. The composition according to claim 1, wherein the non-functionalized polyethylene elastomer is ethylene-1-butene copolymer or ethylene-1-octene copolymer.

16. The composition according to claim 1, wherein the amount of the non-functionalized polyethylene elastomer is at least 30 wt % of the POE composition.

* * * * *